(12) United States Patent
Ketyko et al.

(10) Patent No.: US 11,089,523 B2
(45) Date of Patent: Aug. 10, 2021

(54) METHOD, APPARATUS AND SYSTEM FOR MOBILE EDGE COMPUTING

(71) Applicant: NOKIA SOLUTIONS AND NETWORKS OY, Espoo (FI)

(72) Inventors: Istvan Ketyko, Veroce (HU); Csaba Nemes, Dunakeszi (HU); Laszlo Kecskes, Dunakeszi (HU); Gabor Oravecz, Miskolc (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/307,595

(22) PCT Filed: Jun. 6, 2016

(86) PCT No.: PCT/EP2016/062738
§ 371 (c)(1),
(2) Date: Dec. 6, 2018

(87) PCT Pub. No.: WO2017/211377
PCT Pub. Date: Dec. 14, 2017

(65) Prior Publication Data
US 2019/0306766 A1 Oct. 3, 2019

(51) Int. Cl.
*H04W 56/00* (2009.01)
*H04W 36/00* (2009.01)
(Continued)

(52) U.S. Cl.
CPC ....... *H04W 36/0083* (2013.01); *H04L 41/147* (2013.01); *H04L 41/16* (2013.01);
(Continued)

(58) Field of Classification Search
CPC ............. H04W 36/0083; H04W 4/029; H04W 41/147; H04W 41/16; H04W 16/18; H04W 24/02; H04W 36/32
(Continued)

(56) References Cited

U.S. PATENT DOCUMENTS 6,141,552 A 10/2000 Sendonaris et al.
2015/0111594 A1 4/2015 Cui et al.
(Continued)

FOREIGN PATENT DOCUMENTS

CN 102376025 A 3/2012
CN 105578199 A 5/2016

OTHER PUBLICATIONS

International Search Report and Written Opinion dated Mar. 3, 2017 corresponding to International Patent Application No. PCT/EP2016/062738.
(Continued)

*Primary Examiner* — Sai Ming Chan
(74) *Attorney, Agent, or Firm* — Squire Patton Boggs (US) LLP

(57) ABSTRACT

A method in a telecommunications network, the network including at least one service area, the method comprising: at the network, distributing a mobile edge computing server within a corresponding one of the service areas; at the mobile edge computing server, distributing at least one access point within the corresponding service area; and at the mobile edge computing server, determining a mobile edge computing area within the corresponding service area; wherein at least one of the access points is located within a corresponding one of the mobile edge computing areas.

19 Claims, 4 Drawing Sheets

(51) Int. Cl.
*H04L 12/24* (2006.01)
*H04W 36/32* (2009.01)
*H04W 4/029* (2018.01)
*H04W 16/18* (2009.01)
*H04W 24/02* (2009.01)
*H04W 88/18* (2009.01)

(52) U.S. Cl.
CPC ........... *H04W 4/029* (2018.02); *H04W 16/18* (2013.01); *H04W 24/02* (2013.01); *H04W 36/32* (2013.01); *H04W 88/18* (2013.01)

(58) Field of Classification Search
USPC ........................................................ 370/331
See application file for complete search history.

(56) References Cited

U.S. PATENT DOCUMENTS

| | | | |
|---|---|---|---|
| 2015/0124622 A1* | 5/2015 | Kovvali | H04L 67/1006 370/236 |
| 2015/0261876 A1 | 9/2015 | Trikha et al. | |
| 2017/0118311 A1* | 4/2017 | Frydman | H04L 67/145 |
| 2018/0139691 A1* | 5/2018 | Onishi | H04W 24/10 |
| 2018/0249317 A1* | 8/2018 | Kurasugi | H04W 8/18 |
| 2018/0332524 A1* | 11/2018 | Rasanen | H04W 36/0083 |
| 2019/0042318 A1* | 2/2019 | Ljung | H04L 67/10 |
| 2019/0045409 A1* | 2/2019 | Rasanen | H04W 88/16 |

OTHER PUBLICATIONS

Rodrigo Roman et al., "Mobile Edge Computing, Fog et al.: A Survey and Analysis of Security Threats and Challenges," Arxiv.org, Cornell University Library, Feb. 1, 2016, XP080680714.

"5G Automotive Vision," 3GPP Draft; S1-154241, 3rd Generation Partnership Project (3GPP), Nov. 16, 2015, XP051043559.

Notice of Final Rejection dated Apr. 1, 2020 corresponding to Korean Patent Application No. 2019-7000308.

Communication pursuant to Article 94(3) EPC dated Apr. 1, 2020 corresponding to European Patent Application No. 16728663.2.

"Mobile-Edge Computing (MEC); Technical Requirements; Draft ETSI GS MEC 002," ETSI Draft; vol. ISG-MEC, No. V0.4.2, Jul. 31, 2015, pp. 1-41, XP014250312.

Chinese Office Action corresponding to CN Application No. 201680087758.0, dated May 4, 2020.

European Communication pursuant to Article 94(3) EPC, corresponding to European Application No. 16 728 663.2, dated Nov. 4, 2020.

* cited by examiner

METHOD, APPARATUS AND SYSTEM FOR MOBILE EDGE COMPUTING

FIELD OF TECHNOLOGY

This disclosure relates generally to the field of mobile edge computing (MEC), and more particularly to a method, apparatus and system for supporting MEC services during user mobility.

BACKGROUND

In 5G networks, there are several expectations and architectural enablers for low latency (LL) communications, such as, for example: at a Radio Access Network (RAN) level, LL radio links will be provided; in the RAN, the protocol stack will support LL; and LL switching and mobility will be provided on demand/as a service by the architecture. In addition to a LL mobile network, application component offloading is needed to build up low latency services. To meet such a requirement, an Edge Computing Component (ECC) needs to be placed in proximity to the User Equipment (UE). To support such LL and application component offloading, the concept of Mobile Edge Computing (MEC) has been developed. In MEC, a Mobile Edge Computing Server (MECS) is placed near the edge of the mobile network and close to Access Points (AP) in the network.

Due to the increased mobility of users in the telecommunications network, challenges have arisen regarding how to handle the services to which the user is subscribed. For instance, as a user moves across different geographical areas, one issue that arises is whether the user's services should be migrated out of their original MECS that hosts the service, and moved to the new MECS. Another issue is how to maintain a high QoS when the user moves throughout the network. There can also be cost efficiency issues with such user migration across MECS; specifically with respect to the cost of migrating the services across MECS (due to the heavy amount of communication between the ECCs and the cost to start-up new virtual machines, for example).

SUMMARY

A method in a telecommunications network, the network including at least one service area, the method including: at the network, distributing a mobile edge computing server within a corresponding one of the service areas; at the mobile edge computing server, distributing at least one access point within the corresponding service area; and at the mobile edge computing server, determining a mobile edge computing area within the corresponding service area; wherein at least one of the access points is located within a corresponding one of the mobile edge computing areas.

A system in a telecommunications network includes at least one mobile edge computing server operating in a corresponding service area of the network, the at least one mobile edge computing server configured to define at least one mobile edge computing area within at least one of the corresponding service areas; and at least one access point distributed within at least one of the corresponding service areas, wherein at least one of the access points is located within a corresponding one of the mobile edge computing areas.

An apparatus in a telecommunications network is provided, the apparatus operating in at least one service area of the network, the at least one service area including at least one access point. The apparatus includes a processor and a memory. The processor is configured to define at least one mobile edge computing area within at least one of the corresponding service areas; and to identify at least one access point that is located within the at least one mobile edge computing area within the at least one service area.

DESCRIPTION OF THE SEVERAL VIEWS OF THE DRAWINGS

To aid in the proper understanding of the present disclosure, reference should be made to the accompanying drawings, wherein.

DETAILED DESCRIPTION

Figure 1:
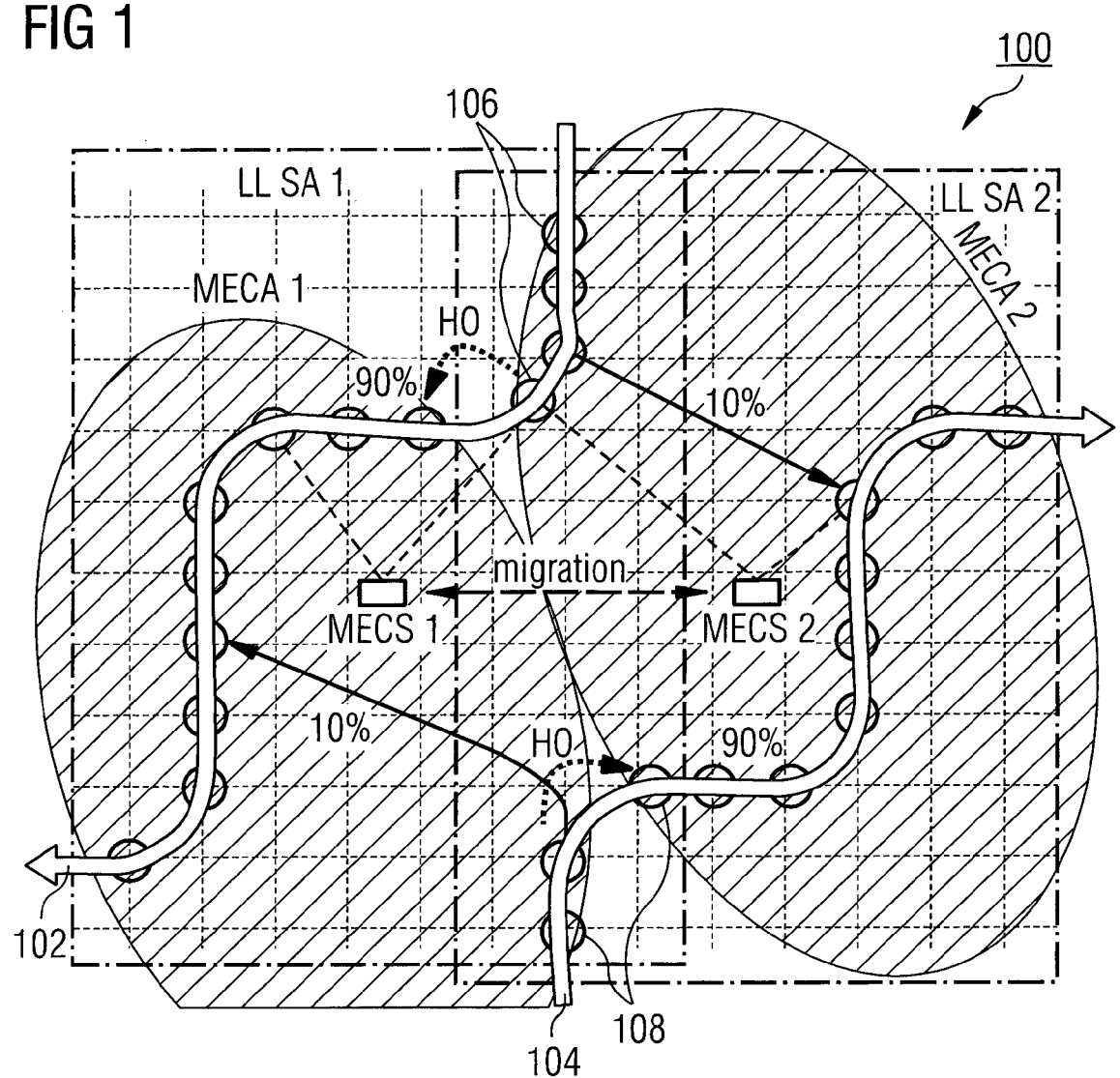
FIG. 1 is an example MEC model in accordance with existing implementations.

The present application provides a method, system, and apparatus for supporting LL MEC services during user mobility. Specifically, FIG. 1 illustrates an example MEC model 100, which focuses on LL V2X (Vehicle-to-Vehicle or Vehicle-to-Infrastructure) services in an urban environment. As shown in FIG. 1, two low latency service areas (LLSA) are provided, which cover the entire city. LLSA1 and LLSA2 overlap with each other, and are formed by network elements (NE) and LL connections. Specifically, in the present embodiment, LLSA1 and LLSA2 are formed by the AP and/or MECS and the LL connections formed between the AP/MECS in their respective LLSAs.

A MECS is deployed into each LLSA; in other words, MECS1 is deployed into LLSA1 and MECS2 is deployed into LLSA2. Each MECS can accept a number of ECCs of the V2X applications connected via the AP in their respective LLSA. As shown in FIG. 1, there are two main roads, Road A 102 and Road B 104, where a high volume of vehicle traffic flow enters the city. As Road A and Road B both enter the city at/near a middle of the model, LLSA1 and LLSA2 overlap. As a result, set of AP 106 and set of AP 108, which are located in the intersection/overlap of LLSA1 and LLSA2, respectively, have LL connections to both MECS1 and MECS2, resulting in double coverage. Such an arrangement can lead to continuity and coverage issues when the user moves from one AP to another AP along the same traffic flow, but crosses from LLSA1 to LLSA2 as a result of such movement. Such movement is known herein as inter-MECS migration, and can lead to service continuity issues, cost issues, and QoS issues, for example.

Turning again to FIG. 1, Mobile Edge Computing Areas (MECA) are defined within each LLSA. Specifically, MECA1 is defined within LLSA1, and MECA2 is defined within LLSA2. As can clearly be seen in FIG. 1, the MECA do not map to the vehicle traffic flow in the corresponding LLSAs. In other words, although Road A 102 is provided within LLSA1, some of the AP along Road A are located within MECA2. Similarly, although Road B 104 is located within LLSA2, some of the AP along Road B are located within MECA1. As a result, the number of inter-MECS migrations are increased because the AP in LLSA1 are not entirely located within MECA1, and the AP in LLSA2 are not entirely located within MECA2.

To reduce such inter-MECS migrations, and in accordance with a present embodiment of the application, vehicle-traffic statistics are collected by the network, and preferably by a controller in the network, which can be either centralized or distributed, as will be described in further detail below. Based on the vehicle-traffic statistics, a set of AP within each respective LLSA can be selected to define a corresponding Mobile Edge Computing Area (MECA).

Figure 2:
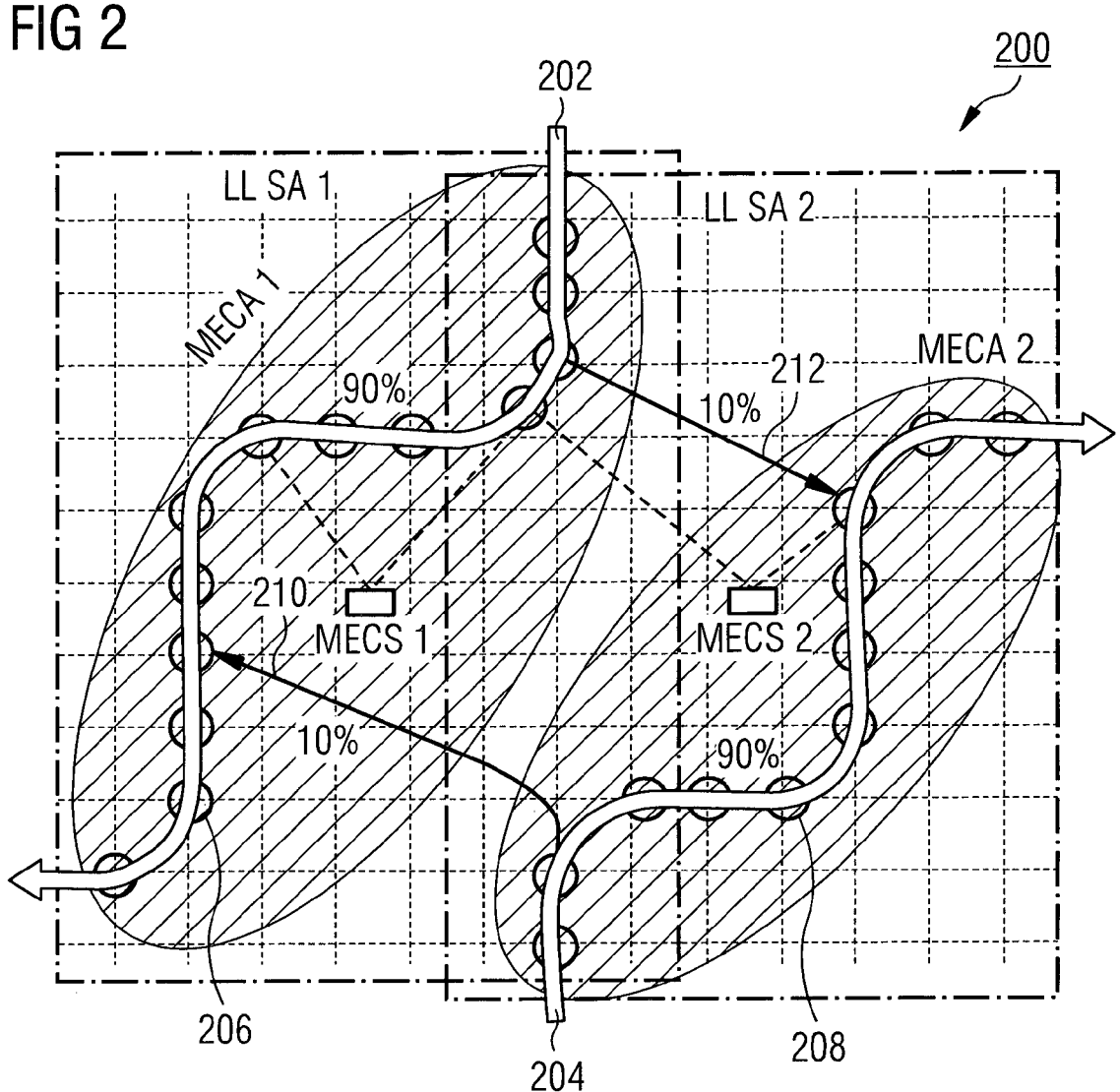
FIG. 2 is an example MEC model in accordance with an embodiment of the present disclosure.

FIG. 2 illustrates a model 200 in accordance with an embodiment of the present application, where the MECA are created based on the vehicle-traffic statistics. The vehicle traffic flow in FIG. 2 is the same as that in FIG. 1, as are the locations of the MECS and LLSAs. However, in model 200, and in accordance with an embodiment of the present application, the MECA are created based on the vehicle-traffic statistics of Road A 202 within LLSA 1 and Road B 204 within LLSA 2. As a result of these statistics, MECA 1 and MECA 2 are defined such that they map to the main traffic flows of Road A 202 and Road B 204, respectively. Such a mapping reduces the number of inter-MECS migrations, because the AP 206 along Road A 202 and the AP 208 along Road B 204 are each defined within separate MECA. While inter-MECS migration may still occur along less dominant paths (i.e., along Road C 210 and Road D 212), the number of inter-MECS migration along the dominant, high-traffic vehicle path is completely or greatly reduced. The method utilized to define such MECA will now be described with reference to FIG. 3.

Figure 3:
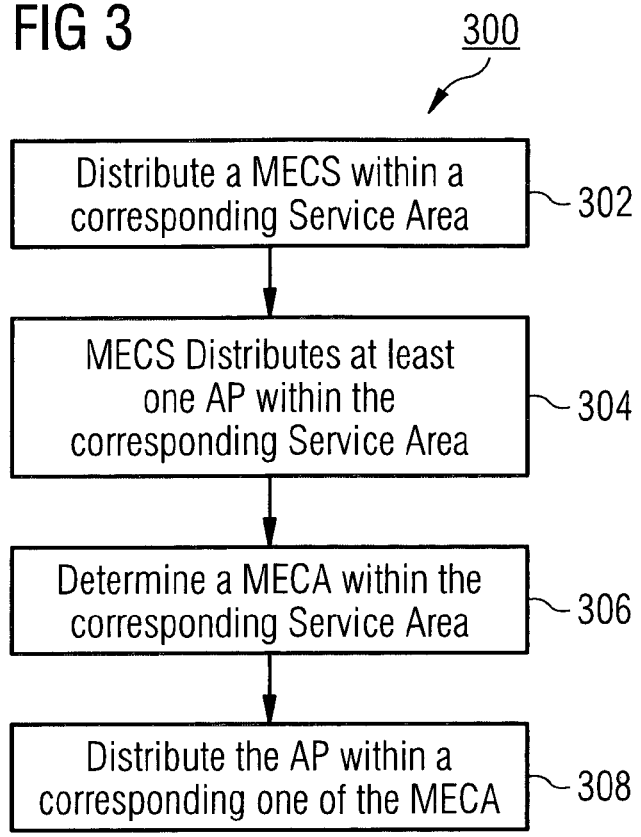
FIG. 3 is a flow chart illustrating a method in accordance with an embodiment of the present disclosure.

FIG. 3 illustrates a method 300 performed in the telecommunications network, and in accordance with an embodiment of the present disclosure. As indicated above, the network includes at least one service area. At 302, a mobile edge computing server (MECS) is distributed within a corresponding one of the service areas. The MECS (shown in FIG. 4 and described in further detail below) then distributes at least one access point (AP) within the corresponding service area (304).

The at least one access point can be distributed based on traffic flow statistics stored in the network (either at the MECS or at a separate controller), for example. Further, and as shown in both FIGS. 1 and 2, the AP can be distributed in an intersection area located between overlapping service areas. In some cases, distributing the at least one access point in an intersection area is based on a capacity of the corresponding MECS (MECS). In other words, and as is known in the art, some of the AP can be defined within the overlap/intersection of LLSA1 and LLSA2 because the corresponding MECS may be unable to handle the load from the AP. The MECS may also distribute the AP within the intersection area of the LLSAs due to the traffic flow characteristics within each LLSA. Such decisions can be made to prevent adversely affecting the QoS of the user/vehicle utilizing the network.

At 306, the MECS determines a mobile edge computing area (MECA) within the corresponding service area, such that at least one of the access points is located within a corresponding one of the MECAs. Alternatively, a separate controller in communication with the MECS can determine the MECA within the corresponding service area. The method 300 further includes, at 308, distributing the access points within a corresponding one of the MECAs. In another embodiment, the AP can be distributed within at least one of the corresponding MECAs. In this embodiment, if the at least one AP belongs to two MECAs, for example, if one of the MECA stops functioning properly, the second MECA can take over until the issues with the first MECA have been resolved.

As indicated above with respect to FIG. 2, the access points are distributed within the corresponding one of the MECAs based on a traffic statistic. It is also contemplated that the AP can be distributed within a corresponding one of the MECA based on a quality of experience metric, and/or an ability to provide a low latency service. It is to be understood that the AP can be distributed among the MECA based on one or a combination of traffic statistics, a Quality of Experience (QoE) metric, reliability (i.e., to maximize the robustness of the operator's service), and an ability to provide a LL service. It is to be further understood that the AP can be distributed among the MECA based on other criteria, such as KPIs set by the network operator, a cost matrix, and a coverage metric, for example. Further, still, the AP can be distributed differently based on an application currently running on the user device. In other words, if a user is running a safety critical application, the AP may be distributed based on reliability; if the users are running a video sharing application, then the AP may be distributed based on QoE, for example. These metrics can be calculated and stored by the network, for example by the MECS in each LLSA, by a separate centralized controller serving the entire network, or by a set of distributed controllers spread throughout the network, for example. The MECA can then be computed by, for example, such a centralized mobile edge computing controller located within the network, or by a set of distributed mobile edge computing controllers, which can be stand-alone devices within each corresponding LLSA, or components that are located within corresponding MECS, for example.

In accordance with the present disclosure, the MECA that are defined are dynamic in nature, and can rapidly change, depending on, for example, the changes in vehicle traffic statistics. Such changes are not time-based, and can occur, for example, when the controller (described below with respect to FIG. 5) has calculated updated dominant traffic routes within each LLSA, for example. Within each defined MECA, migration of the ECC and/or other applications utilized by the user can occur between each AP, without the need for inter-MELS migration. This is in contrast to ECC/application migration in the model shown in FIG. 1, where due to the less than optimal MECAs, the ECC/migration may require moving from MECS1 to MECS2, for example. The present disclosure reduces the need for such inter-MELS migration, and in some cases, eliminates the need for such inter-MELS migration.

In the present disclosure, if an inter-MECA migration is required (i.e., for instances when an ECC migrates between a first AP and a second AP within the same MECA), the decision regarding when to complete such migration can be set by the operator, or determined by the vendor, based on analytics/self-learning/KPI checking, for example. Such a decision regarding when to complete the MECA migration is not within the scope of the present application, and therefore will not be discussed in much further detail herein. The time interval within which to complete such a migration can be in the range of [immediately, ∞], where immediately indicates that the inter-MECA migration occurs at the time of the AP-Handover (HO). Alternatively, the migration could be postponed for a certain time period, for example, because of cost statistics, QoE statistics, or other factors that render a postponement beneficial. If there is a need then an inter-MEGS migration of ECC will occur, which requires an architecture and migration process/method to be defined to support seamless migration of ECC. An ECC of 5G mobile application could be stateless or stateful. In case of a stateful one the migration process is possibly more complex than in the other case. Such details of inter-MELS migration of an ECC are not in the scope of this disclosure and accordingly will not be described in any further detail herein.

Figure 4:
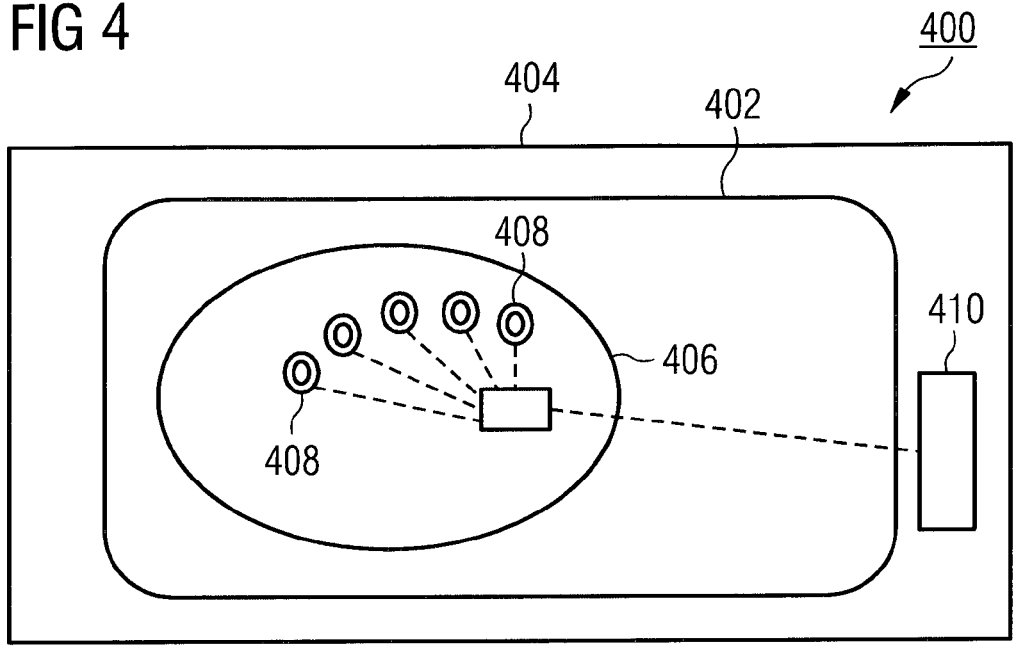
FIG. 4 illustrates a system in accordance with an embodiment of the present disclosure.

FIG. 4 illustrates a system 400 in a telecommunications network and in accordance with the present embodiment. The system 400 includes at least one MELS 402 operating in a corresponding service area 404 of the network. As described above, the at least one MELS 402 can be configured to define at least one MECA 406 within at least one of the corresponding service areas. The system 400 further includes at least one access point 408 distributed within at least one of the corresponding service areas 404, wherein at least one of the access points is located within a corresponding one of the MECAs. The AP 408 can be distributed within the corresponding one of the MECAs based on at least one of a traffic statistic, a quality of experience metric, and an ability to provide a low latency service. Other statistics that can also be considered are, for example, KPIs set by the operator, cost requirements, and coverage requirements.

The system 400 can also include a centralized mobile edge computing controller (or controller) 410 configured to store relevant network data and compute where/how the AP and MECA should be distributed within each corresponding service area. Alternatively, the system 400 could further include at least one distributed mobile edge computing controller or distributed controller (not shown). The distributed controller could be located within a corresponding MECS or provided as a standalone component located within a corresponding LLSA.

Figure 5:
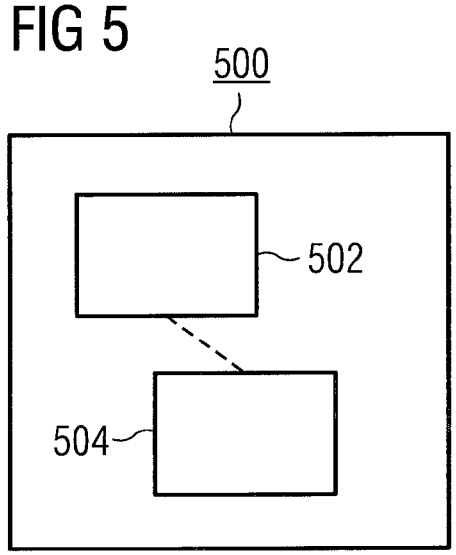
FIG. 5 illustrates an apparatus in accordance with an embodiment of the present disclosure.

Turning now to FIG. 5, an apparatus 500 in a telecommunications network is provided in accordance with an embodiment of the present disclosure. The apparatus 500 operates in at least one service area of the network, the at least one service area including at least one access point. The apparatus 500 includes a processor 502 and a memory 504 in communication with the processor. The processor 502 is configured to define at least one MECA within at least one of the corresponding service areas, and to identify at least one access point that is located within the at least one MECA within the at least one service area. In one embodiment of the disclosure, the apparatus 500 is a centralized mobile edge computing controller that is configured to manage each of the MECAs. In another embodiment of the present disclosure, the apparatus 500 is at least one distributed mobile edge computing controller that is configured to manage a corresponding one of the MECAs.

The processor 502 is further configured to distribute the access points within the corresponding one of the MECAs based on at least one of a traffic statistic, a quality of experience metric, and an ability to provide a low latency service. The statistics/metrics can be provided by the vendor/operators and stored in databases that are located within the memory 504, for example. For example, typical traffic (i.e., number of UE handovers) from one AP to another AP can be calculated using a traffic matrix T, which aggregates the information of available UE. Using this matrix T, for example, the processor 502 can calculate such traffic data, or it can be provided by the vendor/operator.

The processor 502 can further include self-learning capabilities, as known in the art, such that over time, the processor can predict the vehicle traffic statistics, for example, based on past vehicle traffic statistics at similar times of day or during similar city-wide events. Similarly, the self-learning capabilities can include software run by the processor that can predict QoE, cost, and latency patterns based on previous QoE, cost, and latency data stored in the memory 504. Such machine learning capabilities are known in the art and can help to improve the accuracy of the defined MECA. The processor 502 can also be configured to communicate with user equipment (UE) traveling within the corresponding MECA and to save measurements received from the UE in the memory 504; such measurements can be used by the processor 502 to further improve the accuracy of the defined MECA and how the AP are distributed within each corresponding MECA.

The present method, system, and apparatus provide optimal and dynamic MECA that reduces the number of costly inter-MECS migrations of ECC/applications during user mobility. Further, because the MECA are partially based on the available capacity information regarding the corresponding MECS, an AP that belongs to the corresponding MECS is able to and has the capacity to admit a migrating ECC. With the present disclosure, decisions about AP are made based on statistics (such as vehicle traffic, QoE, cost, or other KPIs), rather than relying solely on resource allocation/calculations for each user. Usage of such statistics is beneficial over individual user calculations, because the statists are an aggregated knowledge of each individual user.

In the present disclosure, MECA are calculated for each LLSA, based on, for example, vehicle statistics, QoE, LL requirements, cost, and QoS. The MECA can be configured such that they include AP within a single MELS, thereby greatly reducing the number of inter-MELS migration within the network. Any ECC migration can occur between AP along the same vehicle path and within the same MECA, which can be more cost and bandwidth efficient than ECC migration between AP located in separate and distinct MECA.

Embodiments of the present disclosure may be implemented in software (executed by one or more processors), hardware (e.g., an application specific integrated circuit), or a combination of software and hardware. In an example embodiment, the software (e.g., application logic, an instruction set) is maintained on any one of various conventional non-transitory computer-readable media. In the context of this document, a "non-transitory computer-readable medium" may be any media or means that can contain, store, communicate, propagate or transport the instructions for use by or in connection with an instruction execution system, apparatus, or device, such as a computer. A non-transitory computer-readable medium may comprise a computer-readable storage medium (e.g., memory or other device) that may be any media or means that can contain or store the instructions for use by or in connection with an instruction execution system, apparatus, or device, such as a computer. As such, the present invention includes a computer program product comprising a computer-readable storage medium bearing computer program code embodied therein for use with a computer, the computer program code comprising code for performing any of the methods and variations thereof as previously described. Further, the present disclosure also includes an apparatus which comprises one or more processors, and one or more memories including computer program code, wherein the one or more memories and the computer program code are configured, with the one or more processors, to cause the apparatus to perform any of the methods and variations thereof as previously described.

If desired, the different functions discussed herein may be performed in a different order and/or concurrently with each other. Furthermore, if desired, one or more of the above-described functions may be optional or may be combined.

Although various aspects of the disclosure are set out in the independent claims, other aspects of the disclosure comprise other combinations of features from the described embodiments and/or the dependent claims with the features of the independent claims, and not solely the combinations explicitly set out in the claims.

It is also noted herein that while the above describes example embodiments of the disclosure, these descriptions should not be viewed in a limiting sense. Rather, there are several variations and modifications which may be made without departing from the scope of the present disclosure as defined in the appended claims.

One having ordinary skill in the art will readily understand that the disclosure as discussed above may be practiced with steps in a different order, and/or with hardware elements in configurations which are different than those which are disclosed. Therefore, although the disclosure has been described based upon these preferred embodiments, it would be apparent to those of skill in the art that certain modifications, variations, and alternative constructions would be apparent, while remaining within the spirit and scope of the disclosure. In order to determine the metes and bounds of the disclosure, therefore, reference should be made to the appended claims.

The following abbreviations that may be found in the specification and/or the drawing figures are defined as follows:
AP Access Point
ECC Edge Computing Component
HO Handover
LL Low Latency
LLSA Low Latency Service Area
MEC Mobile Edge Computing
MECA Mobile Edge Computing Area
MELS Mobile Edge Computing Server
QoE Quality of Experience
QoS Quality of Service
RAN Radio Access Network
UE User Equipment
V2X Vehicle-to-Vehicle or Vehicle-to-Infrastructure

The invention claimed is:

1. A method in a telecommunications network, the network including at least one service area, the method comprising:
at the network, distributing a mobile edge computing server within a corresponding one of the service areas;
at the network, collecting vehicle traffic flow statistics;
at the network, storing the vehicle traffic flow statistics in a mobile edge computing server;
at the mobile edge computing server, distributing at least one access point within the corresponding service area based on the vehicle traffic flow statistics; and
at the mobile edge computing server, selecting the at least one access point within the corresponding service areas to define at least one mobile edge computing area within the corresponding service area;
wherein at least one of the access points is distributed within a corresponding one of the mobile edge computing areas.

2. The method of claim 1 wherein distributing the at least one access point includes distributing the at least one access point in an intersection area located between overlapping service areas.

3. The method of claim 2 wherein distributing the at least one access point in an intersection area is based on a capacity of the corresponding mobile edge computing server.

4. The method of claim 2 wherein distributing the at least one access point in an intersection area is based on traffic flow statistics stored in the mobile edge computing server.

5. The method of claim 1 further including distributing the access points within a corresponding one of the mobile edge computing areas.

6. The method of claim 5 wherein the access points are distributed within the corresponding one of the mobile edge computing areas based on at least one of a traffic statistic, a quality of experience metric, and an ability to provide a low latency service.

7. The method of claim 6 wherein the traffic statistic, quality of experience metric, and ability to provide a low latency service are calculated by the network.

8. The method of claim 1 wherein the mobile edge computing server includes a centralized mobile edge computing controller configured for determining the mobile edge computing area, the mobile edge computing controller being located within the network.

9. The method of claim 1 wherein the mobile edge computing server includes a distributed mobile edge computing controller configured for determining the mobile edge computing area, the mobile edge computing controller being located within the network.

10. A system in a telecommunications network, the system comprising:
at least one mobile edge computing server operating in a corresponding service area of the network, the at least one mobile edge computing server configured to collect and store vehicle traffic flow statistics in the network and define at least one mobile edge computing area within at least one of the corresponding service areas based on the collected vehicle traffic flow statistics; and
at least one access point selected within at least one of the corresponding service areas to define the mobile edge computing area, wherein at least one of the access points is distributed within a corresponding one of the mobile edge computing areas.

11. The system of claim 10 wherein the access points are distributed within the corresponding one of the mobile edge computing areas based on at least one of a traffic statistic, a quality of experience metric, and an ability to provide a low latency service.

12. The system of claim 10 wherein the mobile edge computing server includes a centralized mobile edge computing controller.

13. The system of claim 10 wherein the mobile edge computing server includes a distributed mobile edge computing controller.

14. An apparatus in a telecommunications network, the apparatus operating in at least one service area of the network, the at least one service area including at least one access point, the apparatus comprising:
a processor; and
a memory;
wherein the processor is configured to:
collect and store vehicle traffic flow statistics within the network;
distribute the at least one access point within at least one corresponding service area based on the vehicle traffic flow statistics;
select the at least one access point within the corresponding service areas to define at least one mobile edge computing area within at least one of the corresponding service areas; and identify the at least one access point that is distributed within the at least one mobile edge computing area within the at least one service area.

15. The apparatus of claim 14 wherein the apparatus is a centralized mobile edge computing controller.

16. The apparatus of claim 15 wherein the centralized mobile edge computing controller is configured to manage each of the mobile edge computing areas.

17. The apparatus of claim 14 wherein the apparatus is at least one distributed mobile edge computing controller.

18. The apparatus of claim 17 wherein the at least one distributed mobile edge computing controller is configured to manage a corresponding one of the mobile edge computing areas.

19. The apparatus of claim 14 wherein the processor is further configured to distribute the access points within the corresponding one of the mobile edge computing areas based on at least one of a traffic statistic, a quality of experience metric, and an ability to provide a low latency service.

* * * * *